United States Patent [19]

Fujioka et al.

[11] Patent Number: 4,690,957

[45] Date of Patent: Sep. 1, 1987

[54] ULTRA-VIOLET RAY CURING TYPE RESIN COMPOSITION

[75] Inventors: Hirofumi Fujioka; Masami Inoue, both of Amagasaki, Japan

[73] Assignee: Mitsubishi Denki Kabushiki Kaisha, Tokyo, Japan

[21] Appl. No.: 833,165

[22] Filed: Feb. 27, 1986

[51] Int. Cl.$^4$ ................ C08G 59/62; C08L 63/00
[52] U.S. Cl. ................................ 522/31; 522/32; 522/146; 525/524; 525/930
[58] Field of Search ............... 522/146, 31, 32; 525/524, 930

[56] References Cited

U.S. PATENT DOCUMENTS

| | | | |
|---|---|---|---|
| 3,776,729 | 12/1973 | Levy | 522/145 |
| 4,035,189 | 7/1977 | Hayashi | 522/170 |
| 4,168,173 | 9/1979 | Pohl | 522/107 |
| 4,173,476 | 11/1979 | Smith | 522/31 |
| 4,256,828 | 3/1981 | Smith | 522/31 |
| 4,446,286 | 5/1984 | Kolycheck | 522/96 |

Primary Examiner—John C. Bleutge
Assistant Examiner—Arthur H. Koeckert
Attorney, Agent, or Firm—Oblon, Fisher, Spivak, McClelland, & Maier

[57] ABSTRACT

A resin composition of excellent ultra-violet ray curing property and remarkably improved adhesive force to a base material to form a cured coating film, the resin composition being composed of cationically polymerizable compound, photo-initiator, phenoxy resin, and polyhydric alcohol.

2 Claims, 1 Drawing Figure

ULTRA-VIOLET RAY CURING TYPE RESIN COMPOSITION

BACKGROUND OF THE INVENTION

1. FIELD OF THE INVENTION

This invention relates to an ultra-violet ray curing type resin composition which is capable of being easily cured by irradiation of the ultra-violet rays, and of forming a coating film having excellent adhesive force to a base material such as metal, glass, plastic, and so forth.

2. DESCRIPTION OF THE PRIOR ART

As such ultra-violet ray curing type resin composition which has heretofore been known, there are unsaturated polyester resin, epoxy (meth)acrylate resin, urethane (meth)acrylate resin, and so forth. However, these resin compositions are not so satisfactory in their adhesive force to various base materials such as metal, glass, etc., and heat resistance of their coating films.

On the other hand, an application for patent has recently been made by General Electric Company, U.S.A. on a photo-polymerization catalyst for cationically polymerizable compounds such as epoxy resins, etc. While cured coating film of the ultra-violet ray curing type epoxy resin produced by using these catalysts is excellent in its adhesive force to the base materaial, when compared with those conventional acrylate type ultra-violet ray curing type resins, they are still inferior in the adhesive force to the base material, when compared with ordinary thermo-setting epoxy resin compositions, because the resins are cured rapidly in a unit of second by irradiation of the ultra-violet rays, which causes internal stress to remain within the coating film as cured.

In view of such circumstances as mentioned above, the present inventors strenuously repeated studies and researches with a view to obtaining an ultra-violet ray curing type resin composition which is excellent in the ultra-violet ray curing property and is capable of producing cured product having good adhesive force to the base material. As the result of such efforts made, they have found that the cured coating film of excellent ultra-violet ray curing property and having good adhesive force to the base material such as glass, metal, plastic, and so on can be obtained by use of a resin composition which consists essentially of: (A) one or more kinds of cationically polymerizable compound containing, as the principal constituent, an epoxy resin having two or more oxirane rings in one molecule thereof; (B) 0.5 to 20% by weight, with respect to the cationically polymerizable compound, of phenoxy resin having a molecular weight in a range of from 10,000 to 60,000; (C) 0.5 to 20% by weight, with respect to the cationically polymerizable compound, of polyhydric alcohol containing two or more hydroxyl group in its molecule; and (D) an effective amount of from 0.5 to 10% by weight, with respect to the cationically polymerizable compound, of a photo-initiator capable of isolating a Lewis acid catalyst which is able to initiate polymerization of the cationically polymerizable compound by irradiation of the ultra-violet rays. On the basis of this finding, they have completed the present invention.

SUMMARY OF THE INVENTION

It is therefore the primary object of the present invention to provide an improved ultra-violet ray curing type resin composition having excellent ultra-violet ray curing property and being capable of producing a cured product with good adhesive force to a base material.

According to the present invention, in general aspect of it, there is provided an ultra-violet ray curing type resin composition, which consists essential of: (A) one or more kinds of cationically polymerizable compound containing, as the principal constituent thereof, an epoxy resin having two or more oxirane rings in one molecule; (B) 0.5 to 20% by weight, with respect to the cationcally polymerizable compound, of phenoxy resin having a molecular weight in a range of from 10,000 to 60,000; (C) 0.5 to 20% by weight, with respect to the cationically polymerizable compound, of polyhydric alcohol containing two or more hydroxyl group in its molecule; and (D) an effective amount of from 0.5 to 10% by weight, with respect to the cationically polymerizable compound, of a photo-initiator capable of isolating a Lewis acid catalyst which is able to initiate polymerization of the cationically polymerizable compound by irradiation of ultra-violet ray.

The foregoing object, other objects as well as specific ingredients for the ultra-violet ray curing type resin composition and specific conditions for irradiation of the ultra-violet rays according to the present invention will become more apparent and understadable from the following detailed description thereof, when read in conjunction with a few working examples thereof, comparative examples, and illustration in the accompanying drawing.

BRIEF DESCRIPTION OF THE DRAWING

In the drawing, a single

DETAILED DESCRIPTION OF PREFERRED EMBODIMENTS

Figure 1:
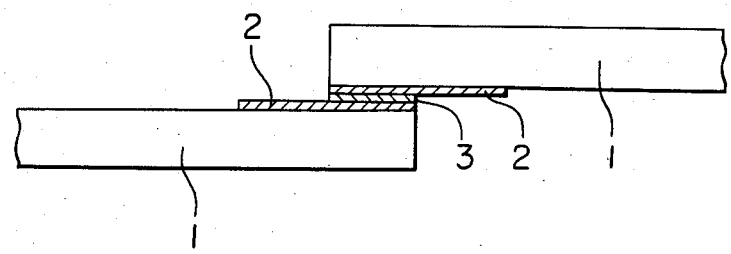
FIG. 1 is a schematic explanatory diagram repesenting a portion of test specimens of the coating film of the resin composition according to the present invention, which are sticked together for measurement of the adhesive strength.

According to the present invention, it could be verified that a resin composition made up simply of the cationically polymerizable compound as the component (A) and the photo-initiator as the component (D) added to (A) renders fragile its coating film cured by irradiation of the ultra-violet rays, and does not produce satisfactory adhesive force to the base material, but that addition of an effective amount of phenoxy resin as the component (B) and polyhydric alcohol as the component (C) would remarkably improve adhesive force of, and impart flexibility to, the resin composition.

The cationically polymerizable compound as the component (A) to be used in the present invention is one or more kinds of cationically polymerizable compounds which contain, as the principal constituent, an epoxy resin having two or more oxirane rings in one molecule thereof. Preferred epoxy resins to be used for the purpose are: bisphenol-A type epoxy resin, novolac type epoxy resin, alicyclic epoxy resin, and so on.

As such bisphenol-A type epoxy resin, there may be exemplified: EPICOTE 828, EPICOTE 834, EPICOTE 836, EPICOTE 1001, EPICOTE 1004, EPICOTE 1007 (all being tradenames for the products of Shell Chemical Company); DER 331, DER 332, DER 661, DER 664, DER 667 (all being tradenames for the products of Dow Chemical Company); ALARDITE 260, ALARDITE 280, ALARDITE 6071, ALARDITE 6084, ALARDITE 6097 (all being tradenames for the products of Ciba-Geigy AG); and so on. These bisphenol-A type epoxy resins may be used singly or in mixture of two or more of them.

As the above-mentioned novolac type epoxy resin, there may be exemplified: EPICOTE 152, EPICOTE 154 (all being tradenames for the products of Shell Chemical Company); ALARDITE EPN 1138, ALARDITE EPN 1139, ALARDITE ECN 1235, ALARDITE ECN 1273, ALARDITE ECN 1280, ALARDITE ECN 1299 (all being tradenames for the products of Ciba-Geigy AG); DEN 431, DEN 438 (all being tradenames for the products of Dow Chemical Company); and so forth. These novolac type epoxy resins may be used singly or in mixture of two or more of them.

Further, as the above-mentioned alicyclic epoxy resin, there may be exemplified: ALARDITE CY 175, ALARDITE CY 177, ALARDITE CY 179, ALARDITE CY 184, ALARDITE CY 192 (all being tradenames for the products of Ciba-Geigy AG); ERL-4221, ERL-4299, ERL-4234 (all being tradenames for the products of Union Carbide Corporation); and so force. These alicyclic epoxy resins may be used singly or in mixture of two or more of them.

Besides the above, it is also possible to use butadiene type epoxy resins. A mixture of various epoxy resins may also be used.

To the above-mentioned cationically polymerizable compounds, there may be added a mono-functional epoxy diluent to such an extent that the curing property of the cationically polymerizable compound is not deterioated.

As such mono-functional epoxy diluent, there may be exemplified: phenyl glycidyl ether, t-butyl glycidyl ether, and so forth.

It is further possible to use a cationically polymerizable vinyl compound in mixture with the epoxy resin. As such cationically polymerizable vinyl compound, there may be exemplified: styrene, aryl benzene, vinyl ether, N-vinyl carbazol, N-vinyl pyrrolidone, and so forth.

As the phenoxy resin for use in the present invention as the component (B), there may be exemplified various high polymers having a molecular weight of from 10,000 to 60,000, and as represented by the following general formula (I).

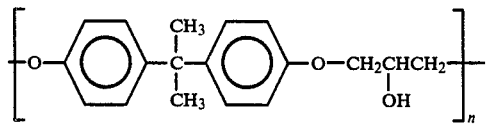

When such phenoxy resin is added to the component (A), it has an effect of imparting flexibility to the cured product, which reflects on improvement in its adhesive force. The adding quantity of the phenoxy resin to the component (A) is in a range of from 0.5 to 20% by weight, or more preferably from 1 to 10% by weight. When the adding quantity is below 0.5%, no sufficient effect of addition can be obtained. On the contrary, when the quantity exceeds 20%, viscosity of the resulting resin composition tends to be too high.

As the method for adding the above-mentioned phenoxy resin to the component (A), there may be adopted one, in which phenoxy resin is dissolved into the component (A) under heat at a temperature ranging from 100° C. to 130° or so, or one, in which a solution obtained by dissolving the phenoxy resin into a solvent is mixed with the component (A), or others.

The polyhydric alcohols to be used in the present invention as the component (C) are those compounds having two or more hydroxyl group in one molecule. Examples of such compounds are: ethylene glycol, propylene glycol, 1,4-butanediol, 1,3-butanediol, 2,3-butanediol, diethylene glycol, dipropylene glycol, triethylene glycol, 1,5-pentanediol, 1,6-hexanediol, neopentyl glycol, 2,2,4-trimethylpentane-1,3-diol, glycerine, trimethylene glycol, polyethylene glycol, polycaprolatone polyol, and so forth. The adding quantity of the polyhydric alcohol to the component (A) may be in a range of from 0.5 to 20%, or more preferably from 1 to 10% by weight, with respect to the component (A).

By the addition of such polyhydric alcohol as mentioned above, it partially reacts with the oxirane ring in the epoxy resin of the component (A), whereby the hydroxyl group is introduced into the cured product. By introduction of such polar group into the cured product, its adhesive force with the base material improves remarkably. Furthermore, owing to the synergistic effect of both phenoxy resin as the component (B) and polyhydric alcohol as the component (C), the cured product increases its adhesive force to a great extent, along with improvement in its solvent-resisting property.

As the photo-initiator which isolates the Lewis acid catalyst capable of initiating polymerization of the cationically polymerizable compound of the component (D), there may be exemplified aromatic diazonium salts, aromatic halonium salts, photosensitive aromatic onium salts of the group VIa or Va elements in the Periodic Table, and others.

Such aromatic diazonium salts are those compounds represented by the following general formula (II).

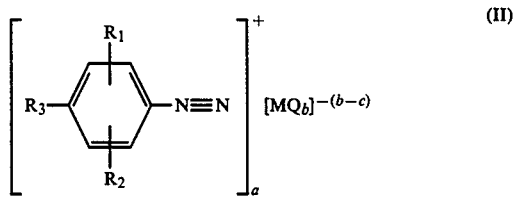

(where: $R_1$ and $R_2$ represent hydrogen, alkyl group or alcoxy group; $R_3$ is an aromatic group bonded by hydrogen, aromatic group, amide group, or sulfur; M denotes a metal or a metalloid; Q is a halogen; and relationship among a, b, and c is so established that $a=(b-c)$ being an integer of 2 to 7 and equal to the atomic valence of M, and b being an integer of 8 or less and greater than c)

Examples of such aromatic diazonium salts are as follows.

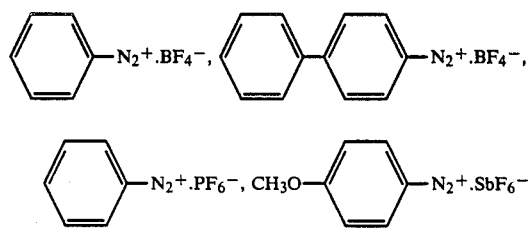

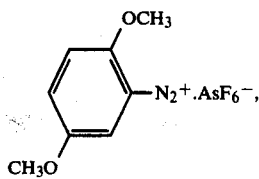

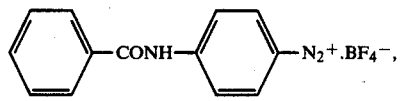

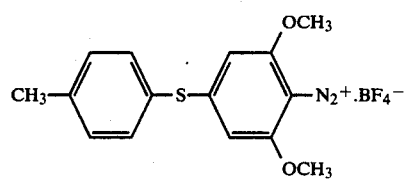

The above-mentioned aromatic halonium salts are those compounds represented by the following general formula (III).

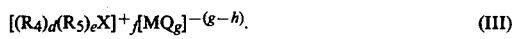

(where: $R_4$ is a monovalent aromatic organic group; $R_5$ is a divalent aromatic organic group; X is a halogen such as iodine, bromine, chlorine, etc.; M is a metal or a metalloid; Q is a halogen; and relationship among d, e, and h is so established that d is equal to 0 or 2, is equal to 0 or 1, (d+e) is equal to 2 or the atomic valence of X, and g is an integer of 8 or less which is greater than h).

Examples of such aromatic halonium salts are as follows.

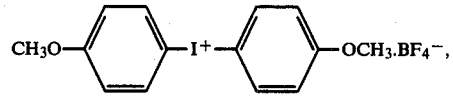

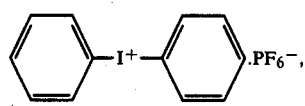

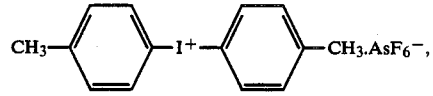

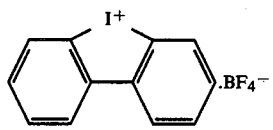

Further, the photosensitive aromatic onium salts of the group VIa or Va elements are those compounds represented by the following general formula (IV).

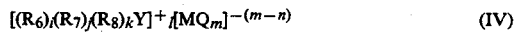

(where: $R_6$ is a monovalent aromatic organic group; $R_7$ is a monovalent aliphatic organic group selected from alkyl group, cycloalkyl group, and substituted alkyl group; $R_8$ is a polyhydric organic group selected from aliphatic organic group and aromatic organic group to constitute the heterocyclic group or the condensation ring structure; Y is a group VIa element of S, Se, Te or a group Va element selected from N, P, As, Sb and Bi; M is a metal or a metalloid; Q is a halogen; and relationship among i, j, k, l, m, and n is so established that i is an integer of from 0 to 4, j is an integer of from 0 to 2, k is an integer of from 0 to 2, (i+j+k) is equal to the atomic valence of Y, which is equal to 3 when Y is the group VIa element and which is equal to 4 when Y is the group Va element, and l is equal to (m−n), n being an integer of from 2 to 7 and equal to the atomic valence of M, and m being an integer of 8 or less and greater than n).

Examples of such onium salts of the group VIa elements are as follows.

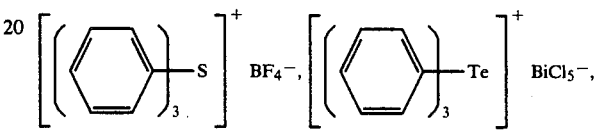

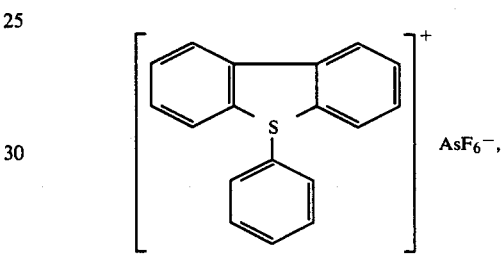

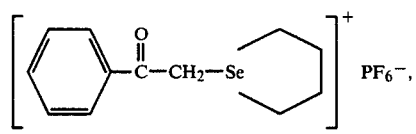

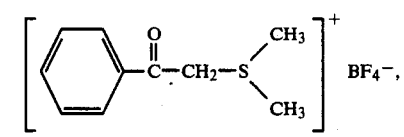

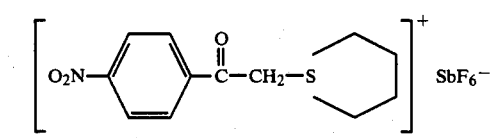

Examples of such onium salts of the group Va elements are as follows.

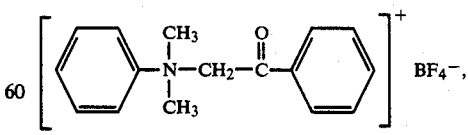

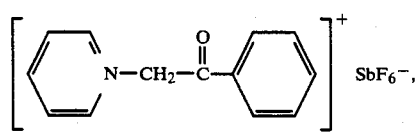

-continued

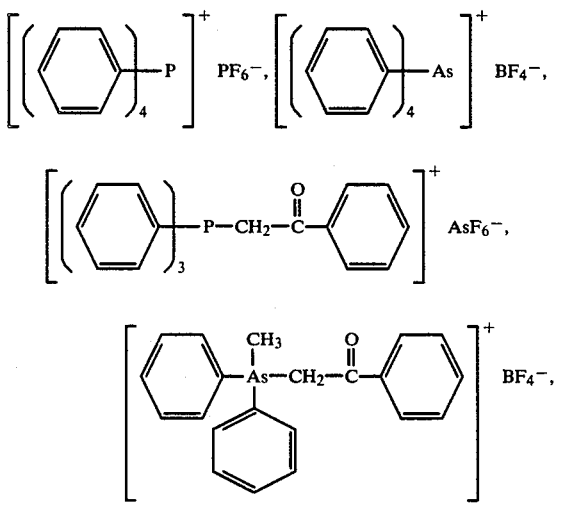

The quantity of the component (D) to be added to the component (A) ranges from 0.5 to 10% by weight, or more preferably from 1 to 5% by weight. When the adding quantity is below 0.5%, the curing speed of the resin composition by irradiation of the ultra-violet rays becomes retarded, whereby the curing time tends to be protracted. On the contrary, when the adding quantity exceeds 10%, the cost for manufacturing the resin composition increases, because the catalyst is very expensive.

When the mixture of the components (A) and (D) is subjected to irradiation of the ultra-violet rays, the component (D) discharges the Lewis acid, which cures the component (A).

By mixing the above-mentioned components (A), (B), (C) and (D), the resin composition according to the present invention can be obtained. Depending on necessity, the resin composition may be added with sensitizer, inorganic filler, pigment, dye, surfactant, viscosity adjusting agent, and so on.

For curing the above-mentioned resin composition, use may be made of irradiation by light source such as low pressure mercury lamp, high pressure mercury lamp, ultra-high pressure mercury lamp, xenon lamp, carbon arc lamp, etc., or irradiation by electron beam.

The resin composition according to the present invention can be used for forming the electrical insulating film, printing ink, marking ink, paint, coating material, and others.

With a view to enabling those persons skilled in the art to put the present invention into practice, the following examples and comparative examples are presented. It should however be noted that the present invention is not limited to these examples alone.

EXAMPLE 1

5 parts by weight of PKHH (a tradename for phenoxy resin produced by Union Carbide Corporation) was dissolved into, and mixed with, 95 parts by weight of ALARDITE CY-179 (a tradename for alicyclic epoxy resin produced by Ciba-Geigy AG) under heat of 120° C., and then cooled down to 40° C. to 50° C. After this, 5 parts by weight of diethylene glycol and 2 parts by weight of triphenyl sulfonium hexafluoroantimonate were dissolved into, and mixed with, the composition to thereby obtain an ultra-violet ray curing type resin composition.

The thus obtained resin composition was coated by a bar coater onto various base materials (i.e., glass plate, aluminum plate and steel plate) to form a coating film of 20 μm thick. After this, the coating film was subjected to irradiation of the ultra-violet rays by use of 2.5 kW high pressure mercury lamp (Model H25-UVA, a product of Mitsubishi Electric Co. Ltd.) as the light source, the irradiation having been carried out at an irradiation distance of 15 cm between the light source and the coating film and a moving speed of the light source at 4 m/min. The irradiation time under the above-mentioned conditions corresponded to approximately 0.75 sec. per one irradiation.

Using the thus produced specimen coating films, measurements were conducted on these cured products as to their pencil hardness, adhesivity and adhesive strength. The results of the measurements are shown in Table 1 below.

Incidentally, evaluation of the adhesivity of the cured coating film was done in such a manner that the cured coating film with a cross-cut having been made in it was subjected to peeling test with cellophane tape. (The cured coating film without peeling off the base material was given a mark "O"; the cured coating film with a partial peeling from the base material was given a mark "Δ"; and the cured coating film showing total peeling from the base material was given a mark "X".)

Evaluation of the adhesive strength was done in such a manner that, as shown in FIG. 1, a cured coating film (2) was formed on a steel plate (1) having a diamension of 1.2 mm ×25 mm ×100 mm, then a pair of such cured coating films were sticked together by use of a room-temperature curing type epoxy resin adhesive agent (3) (ALARDITE STANDARD - a product of Ciba-Geigy AG) with a lapping area of 2.5 being provided between the coating films, and the strength was measured by pulling them apart.

EXAMPLE 2

10 parts by weight of PKHC (a tradename for phenoxy resin produced by Union Carbide Corporation) was dissolved into, and mixed with, 90 parts by weight of ERL-4299 (alicyclic epoxy resin) under heat of 120° C., and then cooled down to 40° C. to 50° C. After this, 3 parts by weight of ethylene glycol and 3 parts by weight of diphenyl iodonium hexafluorophosphate were dissolved into, and mixed with, the composition to thereby obtain an ultra-violet ray curing type resin composition.

The thus obtained resin composition was processed into the test specimens in the same manner as in Example 1 above, and their properties were measured. The results are as shown in Table 1 below.

EXAMPLE 3

3 parts by weight of PKHC was dissolved into, and mixed with, 97 parts by weight of EPICOTE 828 (bisphenol-A type epoxy resin) under heat of 130° C., and then cooled down to 40° C. to 50° C. After this, 10 parts by weight of glycerine and 2 parts by weight of p-methoxyphenyl diazonium tetrafluoroborate were dissolved into, and mixed with, the composition to thereby obtain an ultra-violet ray curing type resin composition.

Using the thus obtained resin composition, test specimens were produced in the same manner as in Example 1 above, and then their properties were measured. The results are as shown in Table 1 below.

COMPARATIVE EXAMPLES 1 to 3

The resin compositions were produced in the same manner as in Examples 1 to 3 above with the exception that phenoxy resin and polyhydric alcohol were omitted from mixing.

Using the thus obtained resin compositions, test specimens were produced, in the same manner as in Example 1 above, and then their properties were measured. The results are as shown in Table 1 below.

TABLE 1

| Example | UV irradiation time (second) | Properties of cured coating film | | | |
|---|---|---|---|---|---|
| | | Pencil hardness | Adhesivity | | Adhesive strength ($kg/cm^2$) |
| | | | Al plate | Steel plate | Glass plate | |
| 1 | 30 | 4H | O | O | O | 120 |
| 2 | " | " | O | O | O | 164 |
| 3 | 30 | 5H | O | O | O | 137 |
| Comparative Example 1 | " | 4H | O | Δ | Δ | 42 |
| Comparative Example 2 | " | 3H | O | Δ | Δ | 65 |
| Comparative Example 3 | " | 4–5H | Δ | X | Δ | 53 |

What is claimed is:

1. An ultra-violet ray curing type resin composition, which consists essentially of:
    (A) at least one kind of cationically polymerizable compound containing, as the principal constituent thereof, an epoxy resin having two or more oxirane rings is one molecule thereof;
    (B) 0.5 to 20% by weight, with respect to said cationically polymerizable compound, of phenoxy resin having a molecular weight in a range of from 10,000 to 60,000;
    (C) 0.5 to 20% by weight, with respect to said cationically polymerizable compound, of polyhydric aliphatic alcohol other than (B) containing two or more hydroxyl groups in its molecule; and
    (D) an effective amount of from 0.5 to 10% by weight, with respect to said cationically polymerizable compound, of a photo-initiator capable of isolating a Lewis acid catalyst which is able to initiate polymerization of said cationically polymerizable compound by irradiation of the ultra-violet rays.

2. An ultra-violet ray curing type resin composition according to claim 1, wherein said photo-initiator is one selected from the group consisting of aromatic halonium salts, and photosensitive aromatic onium salts of the group VIa elements and the group Va elements, and a mixture of two or more kinds of said salts.

* * * * *